Patented Oct. 5, 1948

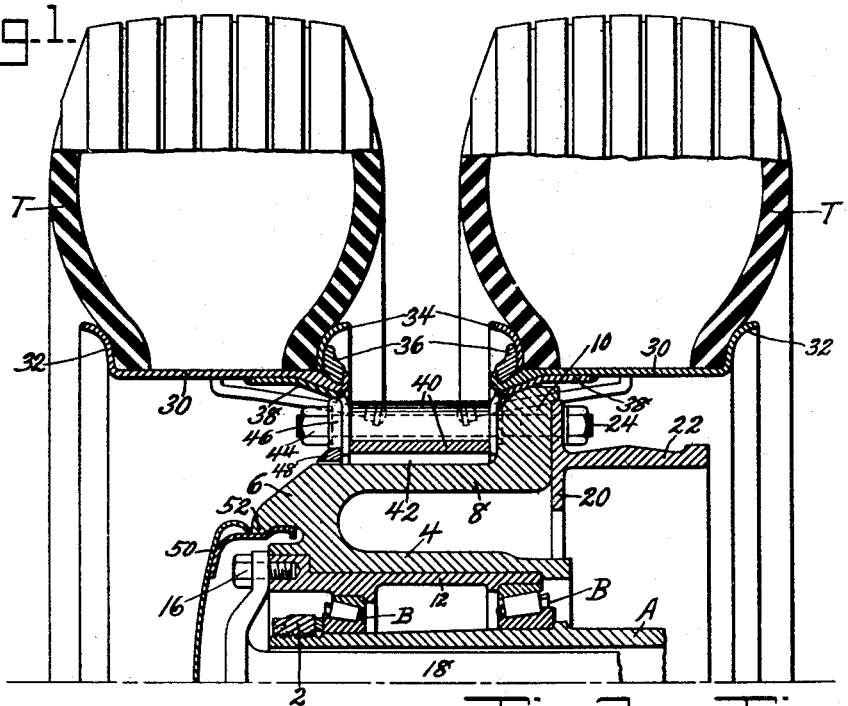

2,450,507

UNITED STATES PATENT OFFICE 2,450,507

VEHICLE WHEEL

Howard A. Flogaus, Wallingford, Pa., assignor to A C F-Brill Motors Company, New York, N. Y., a corporation of Delaware Application July 27, 1943, Serial No. 496,279

6 Claims. (Cl. 301—6)

This invention relates to wheels in general and in particular to vehicle wheels having brake drums attached thereto.

The majority of wheels, whether of highway or railway type, having brake drums attached thereto have been built of some ferrous material such as iron or steel and have had attached thereto ferrous brake drums. With such wheels it has been difficult to dissipate the tremendous heat generated during braking. Furthermore, the wheel, due to the use of ferrous materials, was extremely heavy increasing the unsprung weight of the vehicle. It is an object, therefore, of the present invention to provide a wheel having the major parts thereof formed of a light non-ferrous material, such as aluminum, aluminum alloy or magnesium alloy.

A further object of the invention is the provision of a light weight wheel formed of cast aluminum or aluminum alloy and having high strength steel inserts to provide bearing surfaces.

A still further object of the invention is the provision of a light weight vehicle wheel of considerable bulk and having attached thereto brake drums at points remote from the hub portion of the wheel.

A yet further object of the invention is the provision of a wheel having extremely high thermal conductivity whereby heat of braking may be rapidly dissipated.

These and other objects of the invention will be apparent to persons skilled in the art from a study of the following description and accompanying drawings, in which Fig. 1 is a sectional view of substantially one-half of a dual tired wheel;

Fig. 2 is a similar section but showing a single tired wheel;

Fig. 3 is an elevational view of the wheel and a portion of the rim with tire removed;

Fig. 4 is an elevational view of the loose rim and its attaching lugs;

Fig. 5 is an elevational view of the tire spacing ring utilized in connection with dual tired wheels, and Fig. 6 is an elevational view of the trim ring used on the wheels of Figs. 1 and 2.

Referring now to the drawings in detail, it will be seen that the wheel is mounted on a stationary axle A by means of bearing assemblies B held in place and proper adjustment by nuts 2 threaded on the end of the axle A. Each wheel, whether it be of the single or dual tired type, is formed with a hub portion 4, a short plate portion 6 and a fixed rim 8. Extending outwardly from the fixed rim is a plurality of lugs 10 best shown in Figs. 1, 2 and 3. This entire part of the wheel is formed of some light non-ferrous material, preferably aluminum, aluminum alloy or a magnesium alloy. Since these non-ferrous materials are not suitable for bearing purposes, steel inserts 12 are placed in the hub portion of the wheel and adapted to engage the bearing assemblies B previously referred to. These inserts or liners may be either cast in place, as shown in Fig. 2, in which the flange 14 of the insert is entirely gripped by the non-ferrous material, or they may be pressed into position as shown in Fig. 1. As shown in Fig. 1, and since this is a driving type wheel, the liner is tapped to receive bolts 16 extending through a flange of the live or driving axle 18.

The inner face of the rim 8 and lugs 10 is carefully machined or otherwise treated to provide a flat surface against which the inner flange 20 of a brake drum 22 may bear and which is attached to the non-ferrous wheel rim by means of bolts 24 extending through the lugs 10 and flange 20 of the brake drum. These brake drums are preferably made of a ferrous metal since it is more suitable for braking purposes than any non-ferrous material. As clearly shown in Figs. 1 and 2, the attaching bolts 24 extend through the brake drum flange exterior of the brake drum proper, thus placing the bolts on a large diameter circle thereby relieving unit shearing strains on the bolts, while at the same time making the bolts more readily accessible for removal of the brake drum from the wheel proper.

The tires T, which are shown as of the pneumatic type, are mounted on the loose rims 30 having fixed flanges 32, removable flanges 34 locked in place by locking rings 36. It is obvious, of course, that various other types of loose rims may be used or that the loose rim may even become the tire in case solid tires are used. Secured to the loose rim, as by welding, are a plurality of attaching straps 38 bent so as to overlap the lugs 10 of the wheel rim 8 and be held in position by bolts 24. As shown in Fig. 1, when dual tires are utilized, the bolts 24 are comparatively long in order to receive a tire spacer ring 40 (see Figs. 1 and 5). This spacer ring has pad portions 42 bearing closely against the rim 8 and will serve to hold the straps 38 on the dual tires apart as clearly shown in Fig. 1. The loose rims are securely held in place by means of nuts 44 threaded on bolts 24 and adapted to bear against the upstanding ears 46 of the trim ring 48 (see Figs. 1, 2 and 6). In this manner the tires and loose rims are tightly held in place on the wheel rim 8. Mainly for decorative purposes, the ends of the axles are covered by hub caps 50 of any desired material and finish sprung into position inside of a lip 52 formed in the hub portion of the wheel.

From the preceding it will be seen that a wheel of non-ferrous material and of relatively large bulk has been provided having ferrous bearing inserts and adapted to receive ferrous brake drums attached to the non-ferrous rims at points remote from the hub of the wheel. By attaching the brake drums at points remote from the hub the attaching means is rendered more accessible and the shearing strains are reduced since the securing means is at a greater distance from the axis of rotation. Furthermore, it will be seen that the ferrous brake drum is held in good metallic contact with a comparatively large area of the non-ferrous wheel rim as is evident from Figs. 1 and 2, thereby permitting ready flow of heat from the brake drum to the wheel rim. In case the wheel is made of aluminum or aluminum alloy the heat will be conducted away from the brake drum at a very rapid rate since the thermal conductivity of aluminum and its alloys is roughly four to five times that of steel or iron. Also their specific heat is nearly twice that of steel or iron. In other words, heat generated in the brake drum by braking action will be rapidly dissipated and carried away by the aluminum or aluminum alloy wheel. Due to the large bulk of the wheel its total heat capacity is very great and the heat of ordinary brake applications will be almost immediately absorbed by the wheel for dissipation to the atmosphere. It will be seen that the area of contact between the ferrous brake drum and the non-ferrous wheel rim is at a considerable distance from the wheel hub thus protecting the bearings against any possible over heating which might arise due to the rapid heat transfer by the non-ferrous wheel. In addition the rapid heat transfer to the bearings will be partially blocked by the steel inserts which are also necessary for bearing purposes.

While the improved wheel has been described more or less in detail it will be obvious to persons skilled in the art that various modifications and rearrangements of parts may be made and all such modifications and rearrangements of parts are contemplated as will fall within the scope of the appended claims defining my invention.

What is claimed is:

1. In a one piece wheel, a hub, a rim, spaced lugs projecting outwardly from said rim and adapted to directly receive a demountable tire retaining rim and hold the same in spaced relation to said rim, and a substantially imperforate plate joining said hub and rim, said hub, rim, plate, and the spaced outwardly projecting lugs being formed of a light weight material having a specific gravity of less than one-half that of iron and a thermal conductivity of more than three times that of iron.

2. In a wheel, an aluminum hub, an aluminum rim, a substantially imperforate aluminum plate joining said hub and rim, a plurality of spaced apart aluminum lugs projecting outwardly from said rim and adapted to directly receive a demountable tire retaining rim and hold the same in spaced relation to said rim, and a steel liner positioned in said hub and adapted to receive bearings for transmitting loads to the wheel.

3. In a wheel, a hub, a rim, a plate joining said hub and rim together and all formed of a relatively light weight material, and a brake drum having a braking surface and being secured to said rim by means positioned outwardly of the rim and at a greater distance from the wheel axis than said braking surface, said brake drum being so formed and arranged as to have a relatively large area in direct metallic contact with said rim both inwardly and outwardly of said braking surface.

4. In a wheel, a hub, a rim, a brake drum having a braking surface, means exterior of said rim and braking surface for securing said brake drum in direct metallic contact with the inner edge of said rim, means extending inwardly of said braking surface to increase the area of metallic contact between the brake drum and the inner edge of said rim, and a plate connecting the outer edges of said rim and hub.

5. In a wheel, a hub, a rim, lugs extending outwardly from the inner edge of the rim, a brake drum secured to said lugs and in direct metallic contact with said lugs and substantially the entire inner edge of the rim, and means connecting the outer edges of said rim and hub together.

6. In a wheel, a hub, a rim, lugs extending outwardly from the inner edge of the rim, a brake drum secured to said lugs and having a large area of metallic contact with the inner edge of said rim in order to carry heat from said brake drum, and means connecting the opposite side of said rim and hub together whereby the metallic distance between the brake drum and hub is increased, said hub, rim and connecting means being formed of material having a thermal conductivity of at least three times that of iron.

HOWARD A. FLOGAUS.

REFERENCES CITED

The following references are of record in the file of this patent:

UNITED STATES PATENTS

| Number | Name | Date |
| --- | --- | --- |
| 1,299,301 | Churchill | Apr. 1, 1919 |
| 1,398,739 | Putnam | Nov. 29, 1921 |
| 1,777,223 | Pugh | Sept. 30, 1930 |
| 1,816,943 | White | Aug. 4, 1931 |
| 1,828,162 | Swain | Oct. 20, 1931 |
| 1,861,432 | Barber | June 7, 1932 |
| 1,880,357 | Parker | Oct. 4, 1932 |
| 1,894,251 | Woodward | Jan. 10, 1933 |
| 1,896,821 | Keller | Feb. 7, 1933 |
| 1,990,890 | Barber | Feb. 12, 1935 |
| 2,016,435 | Isidin | Oct. 8, 1935 |
| 2,019,109 | Ash | Oct. 29, 1935 |
| 2,105,317 | Frank | Jan. 11, 1938 |